Patented Dec. 3, 1940

2,223,387

UNITED STATES PATENT OFFICE 2,223,387

PROCESS FOR TREATING PROTEIN CONTAINING MATERIALS

Oreste Scalise, New York, N. Y.

No Drawing. Application April 30, 1938,
Serial No. 205,194

12 Claims. (Cl. 99—153)

The present invention relates to a process of treating protein-containing materials for the improvement thereof, and, more particularly, to a process of treating grains, legumes, and flours, to increase the resistance of said flours and the products thereof to the growth of moulds, to improve the storage qualities, and to conserve the natural color of protein-containing materials and the products made therefrom.

It is common experience that bread made from the highly refined and bleached flours in use to-day moulds in from one day to a week depending upon climatic conditions. Likewise the manufacturers of protein-containing materials used in the arts have always experienced great difficulty in preparing such materials for use in a manner that would ensure that the finished product would not become infected with mould and cease to be acceptable to the trade, due to an offensive odor, before the useful life of the article had been completed. The manufacturers of glues, library pastes, mucilages and the like have sought to overcome this difficulty in many ways. None of the attempts to solve this problem has produced a product which has been wholly satisfactory and acceptable to the trade and public, especially when produced on an industrial scale and in a commercial manner.

The manufacturer of foodstuffs has also been confronted with the problem of bleaching of manufactured products by actinic rays or the atmosphere or similar agencies and has been unable to solve the problem completely. For example, manufacturers of canned goods, such as soups containing noodles, and manufacturers of macaroni and similar alimentary pastes have found that the flour products bleach very easily. Noodles used in certain soups become white and have a washed-out appearance shortly after the soup has been prepared, instead of the pleasing appetizing appearance of the uncooked noodle. Macaroni and the like, when freshly prepared, have an inviting yellow color but upon short exposure to the atmosphere or the actinic rays of the sun or other sources soon become bleached and pale.

It has been the practice of flour millers, for example, to attempt to sterilize flour. However, many of the methods of sterilization result in the bleaching of the natural color of the flour.

Among the various processes proposed may be mentioned those which utilized the effects of the electric arc. In these processes, the flour or similar products were passed below or through an electric arc. Thus, in the so-called Brabender-Dollinger system, an arc is created between two electrodes and the flour passed beneath the arc. In this system, the flour is bleached and loses its natural yellow color. Even the products made from this flour, treated in the most modern way, will have established upon them a growth of mould in a few days. Although many attempts have been made and many processes offered to the industry, nevertheless the art has been confronted with the problem of producing protein-containing material, flour, and the products of protein-containing materials which would retain the natural color of the ingredients and which would be resistant to the growth of mould.

I have discovered a process of treating protein-containing materials which overcomes in an economical and satisfactory manner the difficulties encountered by the prior art.

It is an object of the present invention to provide a method of treating protein-containing material to ensure that the color of the natural ingredients will be fixed therein.

It is another object of the present invention to provide a process of treating wheat proteins, legume proteins and other grain proteins which will ensure that the color of the natural protein material will be conserved.

It is a further object of the present invention to provide a process of treating protein-containing materials entering into the production of bread, cake, cookies, noodles, macaroni and the like to fit the color of natural grain therein and to enhance the keeping qualities of the products.

The present invention also contemplates the provision of a process of treating protein-containing material entering into the production of glues, adhesives, macaroni, noodles and the like to increase the resistance of the manufactured product to the growth of mould.

Other objects and advantages will become apparent from the following description of a process embodying the principles of the present invention.

In general, my process involves subjecting protein-containing material to the action of solutions of nitric acid of critical concentrations. After treatment with nitric acid solution, the excess of acid is neutralized, when necessary, and the product dried and ground, if desirable. It has also been discovered that when protein-containing material is exposed or subjected to the action of gases containing the higher oxides of nitrogen, even under substantially anhydrous conditions, that the resistance to mould growth of the products produced therefrom is enhanced while the color of the natural protein-containing material is fixed therein. In the application of the principles of the present invention, it has been found that subjecting protein-containing material to the action of solutions of nitric acid containing preferably not over about 30% nitric acid for a short period of time at temperatures not exceeding about 100° C., or for longer periods of time, say less than about 5 minutes to solutions containing as little as, say, about 1% nitric acid is sufficient to increase the resistance to the growth of moulds while fixing therein the color of the natural protein-containing material. Likewise, said color may be fixed and the resistance to the growth of moulds may be increased by subjecting the protein-containing material to the action of dilute nitric acid at normal room temperatures for long periods of time, say about 12 to about 16 hours, and subsequently drying the treated material at elevated temperatures. When protein-containing material is subjected to the action of gases containing the higher oxides of nitrogen, the action is rapid and takes place in a very short period of time.

For purposes of illustration, my process will be described in conjunction with the treatment of wheat. The wheat is cleaned by subjecting the grain to a stream of air under pressure in a suitable device. For this purpose, I prefer to use the conventional aspirator. After the wheat is cleaned without the removal of the germ, the whole berry is subjected to the action of a solution of nitric acid of critical concentration, preferably containing about 1 to about 3% nitric acid or, if desired, up to about 30% nitric acid. The wheat is soaked in sufficient acid to cover the berries, the treatment being carried out at normal room temperatures or slightly above when high concentrations of acid, say about 20 to 30% nitric acid, are used, or at temperatures up to about 100° C., and preferably between about 80° C. and 100° C., when more dilute solutions containing about 1% to about 4% nitric acid are used. In carrying out the process embodying the present invention, it has been found, after careful experimentation, that as little time as one to two minutes suffices to fix therein the color of natural wheat and to enhance the resistance of the wheat to the growth of moulds when solutions containing about 2 to about 4% nitric acid are used at temperatures between about 80° C. and about 100° C. After the soaking is completed, the grain is separated from the soaking solution, the excess of solution is removed, and the grain is neutralized and washed. For neutralizing the grain, i. e. the acid clinging to the berries, any suitable alkali, such as ammonia in gaseous or liquid state, alkali metal hydroxide, carbonate or the like, or similar salts or compounds of the alkali earth metals which will form non-poisonous and non-injurious products may be employed. The neutralized berries free of excess acid and alkali are then dried to the desired moisture content and milled. Alternatively, flour may be treated with dilute solutions of nitric acid and dried. After drying, the flour is resistant to the growth of moulds and, in addition, to the surprise of the experts in the art, has fixed therein the yellow color of natural wheat.

In practice, I prefer to use a modified embodiment of the invention which involves subjecting the protein-containing material to gases containing the higher oxides of nitrogen, including the anhydride of nitric acid. In other words, I prefer to use gases containing oxides of nitrogen with a molecular oxygen-nitrogen ratio numerically greater than one, viz: nitrogen dioxide ($NO_2$), nitrogen tetroxide, $N_2O_4$, nitrous anhydride ($N_2O_3$), and nitric anhydride ($N_2O_5$). The modified process can be carried into practice with wheat or soya bean flour in any appropriate apparatus, as those skilled in the art will understand. The wheat (or beans), after being cleaned and ground, is passed into a conveyor or reaction chamber provided with a paddle or a helical conveyor. The flour and gases containing nitrogen oxides may pass in co-current or in counter-current to each other through the reaction chamber or a chute in the proportion of at least about one pound of gas to about 100 pounds flour. When the flour reaches the end of the reaction chamber opposite the inlet end thereof, the flour passes into a similar chamber provided with a device for advancing the flour from the inlet end to the exit end and partially surrounded by a jacket for the passage of heat exchange fluid. The flour may be passed through a plurality of similar drums or chutes when necessary or desired and may be drawn from the last one in a dry state.

In accordance with the principles of the present invention, protein-containing materials, such as vegetable and animal materials containing proteins, may be treated with dilute solutions of nitric acid. Illustrative or my process and product is a wheat flour treated with aqueous dilute nitric acid. Wheat flour is treated with aqueous dilute nitric acid, say about 0.5% nitric acid by weight, in the proportion of about 80 to 95 parts by weight of flour to about 5 to 20 parts by weight of a 0.5% (approximately) nitric acid solution. In other words, about 1 pound of flour is treated with about 5 to about 20% of its weight of a 5% (approximately) nitric acid solution. The mixture is stirred vigorously until thoroughly mixed and then subjected to a temperature of about 150 to 200° F. After the above described treatment the resulting flour may be stored, even under adverse conditions, for a long period without the development of moulds or bacterial growth. It has been found that flour treated in this manner has fixed therein the yellow color of natural wheat. When untreated flour is mixed with flour treated in the manner described hereinabove it has been found that treated flour in an amount as little as about 5 to about 8% by weight of the mixture imparts the property of resisting the growth of moulds. In a similar manner, other materials containing proteins, such as adhesives, glues, etc. likewise may be made resistant to the growth of moulds by the addition of small amounts of the original material which has been treated in accordance with the process disclosed hereinabove.

When wheat flour is to be treated after grinding, it is preferred to carry the present invention into practice in the following manner. The discharge from a flour conveyor passes through a discharge spout. In the discharge spout, a regulating valve is placed, by means of which that portion of the total stream which is to be treated is separated from the main stream and is diverted to the treating apparatus. This may take the form of a conduit or a series of reaction vessels which form a conduit. This portion of the stream represents a small percentage of the total stream and passes to a flour agitator. The flour agitator is preferably driven by a pulley which receives its power from a main drive shaft, although an individual motor or other means of driving the agitator may be provided. The flour to be treated enters the agitator at one end, and the gas mixture containing the higher oxides of nitrogen is introduced under careful regulation a short distance after the flour inlet. That is, when a horizontal agitator is employed, the flour enters the agitator near one end and is drawn to the discharge end by the action of the blades of the agitator. A short distance from the flour inlet and between the flour inlet and the discharge of the agitator, a gas port or inlet for the treating gases is provided. The gas mixture is introduced at such a rate that a proportion of at least 1 pound of higher oxides of nitrogen per 100 lbs. of flour is maintained. The flour passes from the agitator to a plurality of chambers provided with jackets for the circulation of heat exchange fluid. These chambers are preferably in series and provided with suitable devices for the purpose of moving the flour from the inlet end to the outlet end. In these chambers the reaction between the flour and the higher oxides of nitrogen is brought to completion. The heat exchange fluid may be passed counter-current to or co-current with the direction of the stream of flour being treated. The last chamber discharges into a spout or conduit which in turn discharges into the main flour spout of the plant, and thus the treated flour is mixed with the desired amount of untreated flour. It is preferred to introduce ammonia gas into the discharge chute of the last chamber to neutralize residual amounts of acids containing oxides of nitrogen and to produce neutralized flour. Of course, when desired, the treated flour may be segregated from the untreated flour and stored for future use.

Flour which has been subjected to the action of the gases containing higher oxides of nitrogen or dilute solutions of nitric acid has the ability to resist the growth of moulds and has the yellow color of natural wheat fixed therein. The products made from flour treated according to the principles of the present invention, such as bread, cake, cookies, macaroni, noodles and the like retain this yellow color of natural wheat even after exposure to the air and sunlight. In addition, such products resist the growth of moulds to an exceptional degree. It has likewise been discovered that even small amounts of treated flour in admixture with untreated flour fix the yellow color of natural wheat and increase the resistance to the growth of moulds of the entire mixture to a remarkable degree. As little as about 20% and, in fact, even as little as about 0.5% of treated flour and preferably about 8% of mould resistant flour added to conventionally milled unbleached flour is sufficient even under adverse conditions to fix the yellow color of natural wheat and to increase the resistance of products produced therefrom to the growth of moulds.

Although the present invention has been described in conjunction with preferred embodiments and a preferred apparatus for carrying the present invention into practice, it is to be understood that variations and modifications can be made, as those skilled in the art will readily understand. Thus, the term "protein-containing materials" is to be understood to include those materials used in the arts which contain an appreciable amount of protein, such as wheat flour, soya bean flour, flours from other grains and legumes, and other sources of protein matter suitable for the production of manufactured articles, including pastes, glues, etc.

I claim:

1. A method of treating wheat flour to increase the resistance to the growth of moulds and to fix the color of natural wheat which comprises mixing wheat flour and dilute nitric acid in the proportions of about 1 part of flour by weight to about 0.05 to about 0.3 part by weight of about 2% nitric acid solution, stirring until a substantially uniform mixture is obtained, heating said mixture at a temperature of about 150° F. to about 200° F. for about 5 minutes, separating said flour from said solution, and neutralizing excess acid with an alkali metal carbonate, whereby a mould-resistant flour is obtained capable of retaining the yellow color of natural wheat even after being boiled in water.

2. A method of treating wheat to increase its resistance to mould growth and to fix therein the yellow color of natural grain which comprises establishing a body of wheat in a suitable container, introducing sufficient water into said container to cover said wheat and form a reaction mass, heating said reaction mass to about 80° to about 100° C., introducing a quantity of nitric acid into said heated reaction mass in the ratio of about 20 pounds of nitric acid to about 300 pounds of wheat, maintaining the temperature of said reaction mass at about 80° C. to about 100° C. for about 15 to about 20 minutes, separating said wheat from the liquid portion of said reaction mass, washing said wheat with an alkali to neutralize acid, washing said wheat with water and drying said wheat at a temperature of about 35° C. to about 40° C.

3. The process of treating wheat flour to increase the resistance to the growth of moulds and to fix the color of natural wheat which comprises mixing wheat flour and dilute nitric acid in the proportions of about 1 part of flour to about 0.05 to about 0.3 part by weight of about 1 to about 4% nitric acid solution, stirring until a substantially uniform mixture is obtained, heating said mixture at a temperature of about 150° to about 200° F. for about 1 to about 5 minutes, and neutralizing excess acid, whereby a mould resistant flour is obtained capable of retaining the yellow color of natural wheat even after being boiled in water.

4. The process of treating grains, legumes, flour and cereals to increase the resistance to mould growth and to fix the yellow color of natural grain which comprises subjecting grains, legumes, flour and cereals to the action of a solution containing about 0.5% to about 5% nitric acid at a temperature of up to about 100° C. and for up to about 20 minutes to increase their resistance to mould growth and to fix therein the yellow color of natural grain, and neutralizing excess acid whereby grains, legumes, flour and cereals are obtained having the yellow color of natural grain and being resistant to the growth of moulds.

5. The process of treating flour to increase its resistance to mould growth and to fix the color of natural grain therein which comprises mixing flour with an aqueous solution of nitric acid having a concentration of about 0.5 to about 30%; heating said mixture at a temperature up to about 100° C. for about 1 minute to about 16 hours; controlling the nitric acid concentration, the reaction time and the temperature so that, as one of these variables increases toward the maximum, at least one of the other two decreases; and neutralizing excess acid, whereby a mould-resistant flour is obtained having the yellow color of natural grain.

6. The process of treating grains, legumes, flour and cereals to increase the resistance to mould growth and to fix the yellow color of natural grain which comprises mixing grains, legumes, flour and cereals with an aqueous solution of nitric acid having a concentration of up to about 30%; heating said mixture at a temperature of less than the boiling point of the nitric acid solution for up to about 16 hours; correlating the time and the temperature with the nitric acid concentration so as to fix in said grains, legumes, flour and cereals the yellow color of natural grain and to increase their resistance to mould growth; and neutralizing excess acid, whereby grains, legumes, flour and cereals are obtained having the yellow color of natural grain and being resistant to the growth of moulds.

7. The process of treating grains, legumes, flour, cereals and alimentary pastes to increase their resistance to mould growth and to fix therein the yellow color of natural grain which comprises reacting about 100 parts by weight of grains, legumes, flour, cereals and alimentary pastes with one part of a member of the group consisting of nitric acid and oxides of nitrogen having an oxygen-nitrogen molecular ratio greater than unity at about 80 to about 100° C. for a period of up to about 5 minutes to increase their resistance to mould growth and to fix therein the yellow color of natural grain.

8. The process of preparing an improved flour which comprises establishing an aqueous solution of nitric acid having a concentration of about 1 to about 4%, introducing a minor portion of flour into said solution, maintaining said minor portion of flour in contact with said nitric acid solution at a temperature of about 80 to about 100° C. for about 1 to about 5 minutes, neutralizing said minor portion of flour to form a mould resistant flour having the yellow color of natural grain, and mixing about 0.5 to about 20% of said mould resistant flour with about 99.5 to about 80% of conventionally processed flour, whereby all of said improved flour is resistant to mould growth and has the yellow color of natural grain.

9. The process of preparing an improved flour which comprises mixing a minor portion of flour with an aqueous solution of nitric acid having a concentration of about 0.5 to about 30%; heating said mixture at a temperature up to about 100° C. for about 1 minute to about 16 hours; controlling the nitric acid concentration, the reaction time and the temperature so that, as one of these variables increases toward the maximum, at least one of the other two decreases; neutralizing said minor portion of flour; and mixing said minor portion of flour with a major portion of conventionally processed flour, whereby all of said improved flour is endowed with resistance to mould growth and with the yellow color of natural grain.

10. The process of treating flour to increase its resistance to the growth of moulds and to fix therein the yellow color of natural grain which comprises reacting flour at a temperature up to about 100° C. with an aqueous solution of nitric acid of sufficient concentration and for a sufficient period of time to increase its resistance to mould growth and to fix therein the yellow color of natural grain, and neutralizing excess acid, whereby flour is obtained having the yellow color of natural grain and being resistant to the growth of moulds.

11. The process of treating grains, legumes, flour, cereals and alimentary pastes to increase their resistance to mould growth and to fix therein the yellow color of natural grain which comprises reacting about 100 parts by weight of grains, legumes, flour, cereals and alimentary pastes with one part of a member of the group consisting of nitric acid and oxides of nitrogen having an oxygen-nitrogen molecular ratio greater than unity at up to about 100° C. for a sufficient period of time to increase their resistance to mould growth and to fix therein the yellow color of natural grain.

12. The process of preparing an improved flour which comprises establishing an aqueous solution of nitric acid having a concentration of about 1 to about 4%, introducing a minor portion of flour into said solution, maintaining said minor portion of flour in contact with said nitric acid solution at a temperature of up to about 100° C. for a sufficient period of time to increase the resistance of said minor portion of flour to mould growth and to fix therein the yellow color of natural grain, neutralizing said minor portion of flour to form a mould resistant flour having the yellow color of natural grain, and mixing about 0.5 to about 20% of said mould resistant flour with about 99.5 to about 80% of conventionally processed flour, whereby all of said improved flour is resistant to mould growth and has the yellow color of natural grain.

ORESTE SCALISE.